Patented Aug. 28, 1951

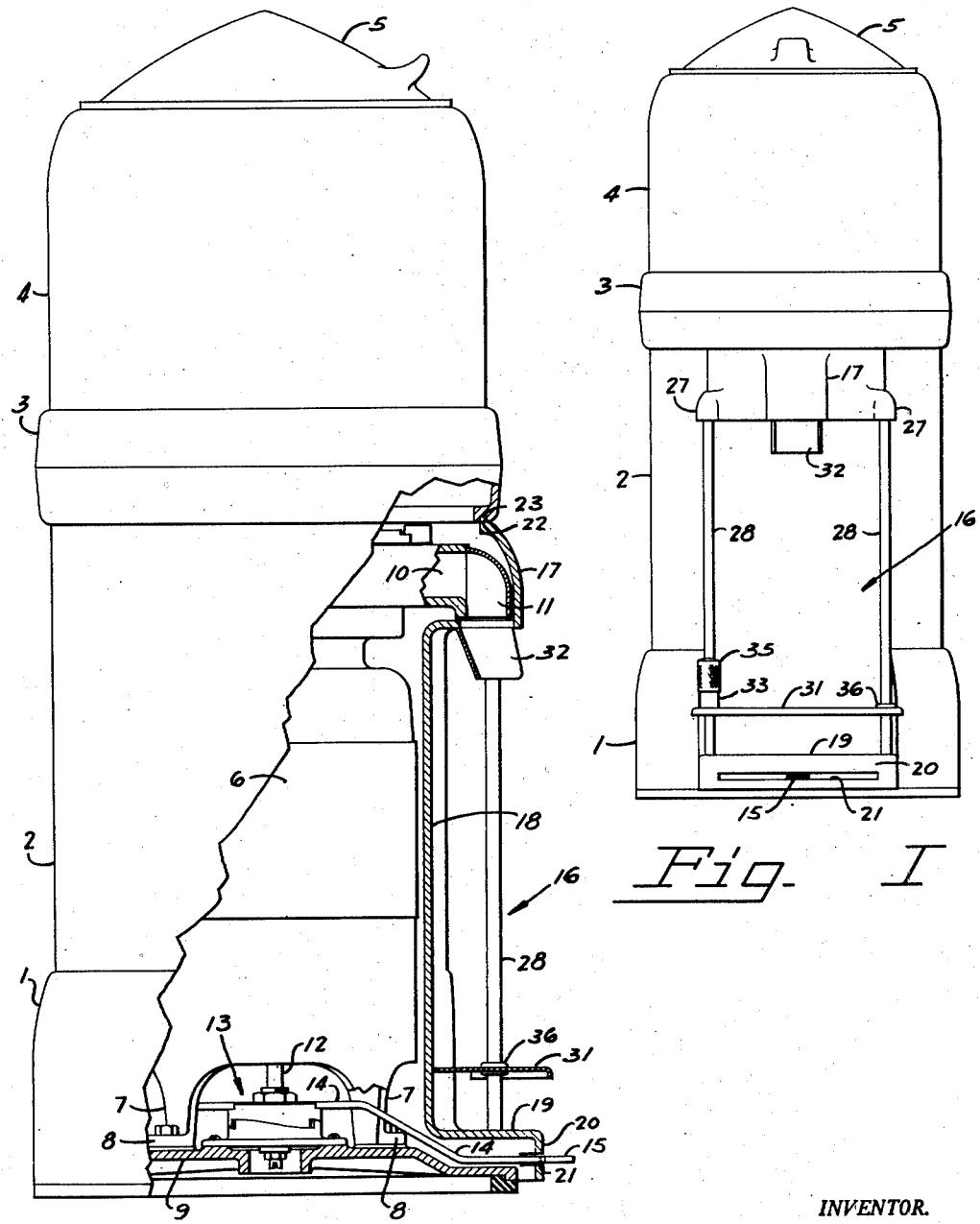

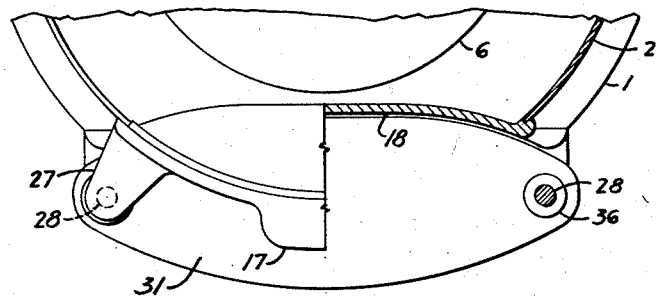
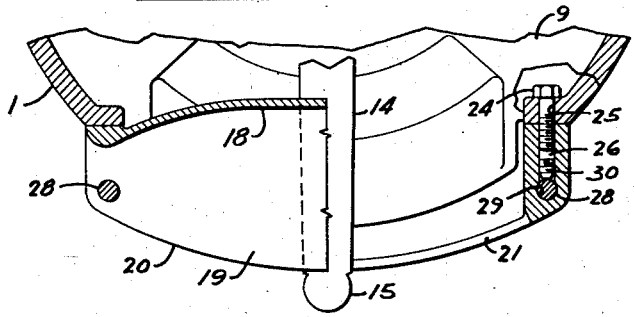
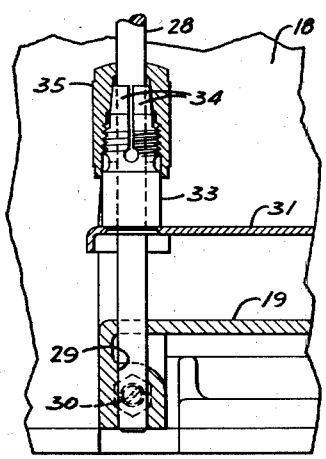
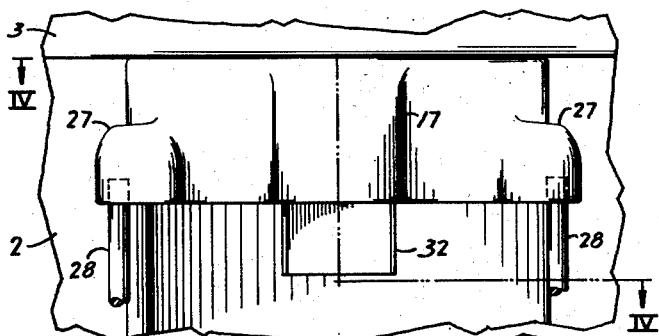
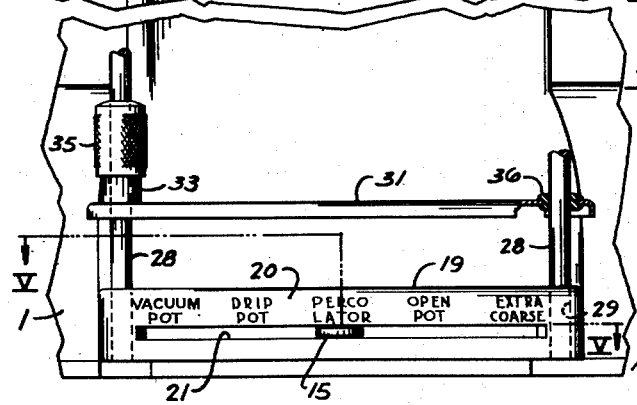

2,566,279

UNITED STATES PATENT OFFICE 2,566,279

BAG HOLDER FOR COFFEE MILLS

George Rue Wood, Toledo, Ohio, assignor to Toledo Scale Company, Toledo, Ohio, a corporation of New Jersey Application January 18, 1946, Serial No. 641,971

3 Claims. (Cl. 226—47)

This invention relates to coffee mills and in particular to improved means for supporting a receptacle receiving the ground coffee.

Coffee grinders that are used in retail stores for grinding coffee at the time of sale are limited in several respects. They must be made as compact as possible so as to require a minimum of counter space. They must not be too tall or it is difficult for a short person to reach the top to put coffee into the hopper and they should have means for conveniently supporting a receptacle for the ground coffee. It has been general practice to disregard this last requirement in an endeavor to reduce the size of the coffee mill and the amount of counter space required by the mill.

The principal object of this invention is to provide convenient means for supporting a receptacle receiving ground coffee which means do not materially increase the counter space required by the mill.

Another object is to provide adjustable means which may be readily adjusted to accommodate coffee receptacles or bags of various heights.

These and other objects and advantages are attained according to the invention by providing, in a coffee mill having a generally cylindrical housing, a cast concave front for the housing. The cast concave front provides a recess under the discharge opening of the coffee grinder, a hood covering the end of the discharge passage of the grinder and mounting means for a movable shelf which may be located at any point between the mouth of the discharge opening and the base of the coffee mill. The shelf mounting means also serve as side supports for the larger sizes of receptacles or bags for receiving the ground coffee.

The specific example selected to illustrate the invention is shown in the accompanying drawings, in which:

Figure I is a front elevation of a vertical coffee mill incorporating the improved receptacle holding means.

Figure II is a side elevation with parts broken away and the receptacle stand shown in section.

Figure III is a fragmentary front elevation of the improved receptacle holder.

Figure IV is a fragmentary, horizontal section taken substantially along the line IV—IV of Figure III.

Figure V is a fragmentary, horizontal section taken along the line V—V of Figure III.

Figure VI is an enlarged fragmentary view showing the clamping means for holding the adjustable shelf in position.

These specific figures and the accompanying description are intended merely to illustrate the invention but not to impose limitations on the claims.

The coffee mill selected to illustrate the invention is of a vertical type whose housing comprises a generally cylindrical base 1, a cylindrical sheet metal housing 2, a housing transition ring 3, a hopper support 4 and a top cover 5.

A driving motor 6 designed to operate with its armature shaft vertical has legs 7 terminating in feet 8 which are secured, as by bolting, to a shelf 9 of the cylindrical base 1. A grinding chamber whose discharge passage 10 is shown in Figure II is supported on the upper end of the motor and grinding burrs contained within the grinding chamber are driven by the motor 6. Coffee to be ground is placed in a hopper under the cover 5 from which it feeds into the top of the grinding chamber, is ground and is forced outwardly along the discharge passage 10 and falls from an elbow 11 at the end of the passage 10.

The lower one of the pair of grinding burrs is slidably mounted on a tubular armature shaft of the motor 6 and the clearance between the burrs is regulated by the axial position of an adjusting rod 12 extending axially through the tubular motor shaft and supported at its lower end on a cam assembly 13. An arm 14 attached to the movable member of the cam assembly extends forwardly between two of the legs 7 of the motor 6 and is bent downwardly and forwardly to follow the contour of the shelf 9 of the base 1. Its outer end is fashioned to form a handle 15. Detent means (not shown) are provided to maintain the cam in any position selected by operation of the handle 15.

The fronts of the housing 2 and base 1 are cut away to provide space for a bag holder 16 which consists of a single casting or stamped metal piece having at its upper end a hood portion 17 overlying the elbow 11 at the end of the discharge passage of the grinding chamber. A vertical, cylindrical, concave section 18 of the bag holder 16 provides a shallow recess beneath the discharge opening. The lower end of the concave section 18 terminates in a fixed shelf 19 extending forwardly and spaced slightly above the forward portion of the shelf 9 of the base 1. The forward edge of the shelf 19 is turned down to provide an apron 20 having a slot 21 to accommodate the cam adjusting handle 15. The sides of the concave, cylindrical portion 18 are adapted to overlie the edges of the cut away portion of the housing 2 while the top of the hood portion 17 is formed with a lip 22 adapted to engage a downwardly directed groove 23 cut in the lower surface of the transition ring 3.

The sides of the shelf 19 are of relatively thick section as seen in Figure V so that bolts 24 extending through holes 25 in the lower front edge of the side wall of the base 1 and below the base shelf 9 may be screwed in threaded holes 26 drilled and tapped in the edge of the shelf 19. The bag holder 16 may be installed in the housing by merely engaging the lip 22 with the groove 23, pushing the bottom of the casting in toward the base 1 taking care to thread the handle 15 through the slot 21 and then inserting and tightening the bolts 24 whose heads are accessible from the bottom of the base 1.

In addition to the hood 17 the upper end of the bag stand 16 is provided at its sides with a pair of outwardly extending ears 27 adapted to support the upper ends of a pair of rods 28 whose lower ends are held in holes 29 drilled vertically through the sides of the shelf 19 and intersecting the drilled and tapped holes 26. The rods 28 are clamped in place by set screws 30 driven into the threaded holes 26 ahead of the bolts 24.

An adjustable shelf 31 is slidably mounted on the rods 28 so that it may be positioned anywhere between a chute 32 extending downwardly from the hood 17 and the fixed shelf 19. The adjustable shelf 31 is held in adjusted position by a collet clamp 33. The collet sleeve 33 has tapered rod-engaging fingers 34 held in frictional engagement with one of the rods 28 by a clamping nut 35 threaded onto the sleeve 33. The exterior of the nut 35 is knurled so that it may be easily manipulated. The bottom end of the sleeve is riveted into the adjustable shelf 31. The other end of the adjustable shelf 31, which is guided by the other of the rods 28, is fitted with a grommet 36 surrounding the rod. The grommet 36 fits the rod closely and the hole in the shelf loosely so that it may move with respect to the shelf 31 to accommodate any misalignment of the rods without binding or evidencing such misalignment.

The collet sleeve 33 is of sufficient length so that in addition to clamping the shelf it also serves to hold the shelf level at all times.

The rods 28 are spaced sufficiently far apart so that the larger coffee bags may be placed between them and be guided or supported by them. By making the coffee bag holder an integral part of the coffee mill it does not materially increase the size of the coffee mill nor the amount of counter space required. It provides a firm support for various sizes of coffee bags and is adjustable so that regardless of its height the coffee bag may be engaged with the chute 32.

The specific example illustrates a preferred form of the invention. Various modifications may be made without departing from the invention or losing the advantages thereof.

Having described the invention, I claim:

1. In a coffee mill having a generally cylindrical housing and a discharge opening in a side thereof, in combination, a housing wall section the outer surface of which beneath the discharge opening is concave, a shelf at the bottom of the concave wall section and extending outward from the concave side of the wall section, a pair of rods one mounted near the center of each end of the shelf and extending upwardly from the shelf parallel to and in front of the sides of the concave wall section, and a second shelf adjustably mounted on the rods.

2. In a coffee mill having a generally cylindrical housing and a discharge opening in a side thereof, in combination, a housing wall section the outer surface of which beneath the discharge opening is concave, said wall section having a forwardly extending hood portion that surrounds the discharge opening, a forwardly extending shelf at the bottom of the concave wall section, a pair of rods extending along the sides of the wall section and supported in the shelf and the forwardly extending portion, and a sliding shelf adjustably mounted on the rods.

3. In a coffee mill having a generally cylindrical housing and a discharge opening in a side thereof, in combination, a housing wall section the outer surface of which beneath the discharge opening is concave, said wall section having a forwardly extending hood portion that surrounds the discharge opening, a shelf formed integrally with the bottom of the concave wall section, a pair of rods supported in the shelf and forwardly extending portion and located along the side of the concave wall section, a sliding shelf adjustably mounted on the rods and positioned over the first shelf, and a clamp mounted on and extending above the sliding shelf for locking the sliding shelf to the rods.

GEORGE RUE WOOD.

REFERENCES CITED

The following references are of record in the file of this patent:

UNITED STATES PATENTS

| Number | Name | Date |
|---|---|---|
| 606,967 | Hanger | July 5, 1898 |
| 786,151 | Ribert | Mar. 28, 1905 |
| 1,018,228 | Appleby et al. | Feb. 20, 1912 |
| 1,323,147 | Becker | Nov. 25, 1919 |
| 1,500,964 | Starks | July 8, 1924 |
| 1,571,608 | Stillman | Feb. 2, 1926 |
| 1,673,156 | O'Donnel et al. | June 12, 1928 |
| 2,019,013 | Kopf | Oct. 29, 1935 |
| 2,090,634 | Meeker | Aug. 24, 1937 |
| 2,094,548 | Meeker | Sept. 28, 1937 |
| 2,212,883 | Meeker | Aug. 27, 1940 |
| 2,300,542 | Forse | Nov. 3, 1942 |

FOREIGN PATENTS

| Number | Country | Date |
|---|---|---|
| 561,274 | France | Aug. 2, 1923 |
| 481,315 | Germany | Aug. 17, 1929 |